United States Patent
Marathe

(10) Patent No.: US 9,229,698 B2
(45) Date of Patent: Jan. 5, 2016

(54) METHOD AND APPARATUS FOR COMPILER PROCESSING FOR A FUNCTION MARKED WITH MULTIPLE EXECUTION SPACES

(71) Applicant: Nvidia Corporation, Santa Clara, CA (US)

(72) Inventor: Jaydeep Marathe, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/089,542

(22) Filed: Nov. 25, 2013

(65) Prior Publication Data

US 2015/0149987 A1 May 28, 2015

(51) Int. Cl.
*G06F 9/45* (2006.01)

(52) U.S. Cl.
CPC .............. *G06F 8/443* (2013.01); *G06F 8/4452* (2013.01); *G06F 8/433* (2013.01)

(58) Field of Classification Search
None
See application file for complete search history.

(56) References Cited

U.S. PATENT DOCUMENTS

| | | | |
|---|---|---|---|
| 5,765,036 A | 6/1998 | Lim | |
| 7,353,369 B1 * | 4/2008 | Coon et al. | 712/234 |
| 8,296,743 B2 | 10/2012 | Linderman et al. | |
| 8,375,368 B2 | 2/2013 | Tuck et al. | |
| 8,443,348 B2 | 5/2013 | McGuire et al. | |
| 8,448,156 B2 | 5/2013 | Demetriou et al. | |
| 2009/0158246 A1 * | 6/2009 | Sifter et al. | 717/105 |
| 2009/0158248 A1 * | 6/2009 | Linderman et al. | 717/106 |
| 2010/0138376 A1 | 6/2010 | Avis et al. | |
| 2010/0153934 A1 | 6/2010 | Lachner | |
| 2010/0250809 A1 | 9/2010 | Ramesh et al. | |
| 2011/0185359 A1 | 7/2011 | Chakrabarti | |
| 2011/0314256 A1 | 12/2011 | Callahan, II et al. | |
| 2011/0314444 A1 | 12/2011 | Zhang et al. | |
| 2011/0314458 A1 | 12/2011 | Zhu et al. | |
| 2012/0198178 A1 | 8/2012 | Cox et al. | |
| 2012/0317556 A1 | 12/2012 | Zhu et al. | |
| 2013/0036408 A1 | 2/2013 | Auerbach et al. | |
| 2013/0036409 A1 | 2/2013 | Auerbach et al. | |
| 2014/0026111 A1 * | 1/2014 | Stitt et al. | 717/101 |

(Continued)

OTHER PUBLICATIONS

Christopher J. Rossbach, Yuan Yu, Jon Currey, Jean-philippe Martin and Dennis Fetterly. "Dandelion: a Compiler and Runtime for Heterogeneous", [online] Nov. 3-6, 2013 [retrieved on Feb. 23, 2015], retrieved from Internet. <http://research.microsoft.com/pubs/201110/sosp13-dandelion-final.pdf>.*

(Continued)

*Primary Examiner* — Isaac T Tecklu
*Assistant Examiner* — Shirin Alizadeh

(57) ABSTRACT

A method for processing a function with a plurality of execution spaces is disclosed. The method comprises creating an internal compiler representation for the function. Creating the internal compiler representation comprises copying substantially all lexical tokens corresponding to a body of the function. Further, the creating comprises inserting the lexical tokens into a plurality of conditional if-statements, wherein a conditional if-statement is generated for each corresponding execution space of said plurality of execution spaces, and wherein each conditional if-statement determines which execution space the function is executing in. During compilation, the method finally comprises performing overload resolution at a call site of an overloaded function by checking for compatibility with a first execution space specified by one of the plurality of conditional if-statements, wherein the overloaded function is called within the body of the function.

20 Claims, 8 Drawing Sheets

```
410    ►int bar(double in) restrict(amp, cpu)
       {
430 ──►  if (is_execution_mode(amp)) {
420 ──►    return foo((int)in);  // invoke "amp" version of "foo",
                                 // which has "int" parameter type.
                                 // Notice compiler-inserted cast
450 ──► } else if (is_execution_mode(cpu)) {
440 ──►    return foo(in);       // invoke "cpu" version of "foo",
                                 // which has "double" parameter type
         }
       }

410    ► int bar(double in) restrict(amp, cpu)
       {
420 ──►return foo((int)in);   // invoke "amp" version of "foo",
                              // which has "int" parameter type
       }
```

(56) References Cited

U.S. PATENT DOCUMENTS

2014/0096147 A1* 4/2014 Aarts et al. .................. 719/320
2014/0137087 A1* 5/2014 Cimadamore et al. ........ 717/140

OTHER PUBLICATIONS

Moussa Taifi, Abdallah Khreishah, Justin Y. Shi. "Natural HPC Substrate: Exploitation of Mixed Multicore CPU and GPUs", [online], [retrieved on 2015-02-023], retrieved from Internet. <ieeexplore.ieee.org/stamp/stamp.jsp?tp=&arnumber=5999804>.*
Fast and Focus search attachment.*
Ueng, et al., "CUDA-lite: Reducing GPU programming complexity," Journal (2008) vol. (5335): pp. 10-24. Springer-Verlag Berlin Heidelberg.
"The Authoritative Dictionary of IEEE Standards Terms, Seventh Edition", IEEE Std 100-2000, Published Feb. 27, 2007, pp. 625 & 752.

* cited by examiner

```
210 ──▶ void foo(void) restrict(amp) { }   // 1. "foo" targeting "amp"
                                            //    execution space 220 ──▶ void foo(void) restrict(cpu) { }   // 2. "foo" targeting "cpu"
                                            //    execution space 230 ──▶ void bar(void) restrict(cpu, amp) { }

240 ──▶ void first(void) restrict(amp)
        {
250 ──▶   foo();// calls "amp" version of "foo" (1.)
        }

260 ──▶ void second(void) restrict(cpu)
        {
270 ──▶   foo();// calls "cpu" version of "foo" (2.)
        }
```

FIG. 2

```
310 ──▶ double foo(double doubleval) restrict(cpu)
        {
            return doubleval + 10;
        }
330 ──▶ double foo(int intval)              restrict(amp)
        {
            return intval + 20;
        }
350 ──▶ int bar(double in)    restrict(amp, cpu) { return foo(in); }
                                                               ▲
                                                               ┆
                                                              360
```

FIG. 3

```
410 ── int bar(double in) restrict(amp, cpu)
      {
430 ──── if (is_execution_mode(amp)) {
420 ────── return foo((int)in);  // invoke "amp" version of "foo",
                                 // which has "int" parameter type.
                                 // Notice compiler-inserted cast
450 ──── } else if (is_execution_mode(cpu)) {
440 ────── return foo(in);       // invoke "cpu" version of "foo",
                                 // which has "double" parameter type
      }
```

FIG. 4A

```
410 ── int bar(double in) restrict(amp, cpu)
      {
420 ──── return foo((int)in);    // invoke "amp" version of "foo",
                                 // which has "int" parameter type
      }
```

FIG. 4B

```
510 ──▶ int test(double in) restrict(amp, cpu)
        {
            if (in == 0.0) { goto L2; } return 1;
540 ──▶ L2:
            return 2;
        }
```

FIG. 5A

```
560 ──▶ int test(double in) restrict(amp, cpu)
        {
570 ──▶     if (is_execution_mode(amp)) {
580 ──▶         if (in == 0.0) { goto L2_amp;   // renamed label
                } return 1;
591 ──▶     L2_amp:                              // renamed label
                return 2;
593 ──▶     } else if (is_execution_mode(cpu)) {
594 ──▶         if (in == 0.0) { goto L2_cpu;   // renamed label
                } return 1;
596 ──▶     L2_cpu:
                return 2;
            }
        }
```

FIG. 5B

660 → int foo(void) restrict(amp) { return 10; }
670 → double foo(void) restrict(cpu) { return 20.5; }

680 → int bar(void) restrict(amp, cpu) { return foo(); } // Illegal in
                                                         // AMP!
                                            ↑
                                           690

FIG. 6

```
struct S1_t {
    operator int(void) restrict(amp) { return 20; } // implicit conversion function from S1_t to int
};

int operator+(S1_t, int)  restrict(cpu) { return 10; } // operator+ function call 750 ──▶ int compute(void) restrict(amp, cpu)
{
    S1_t temp;
    return (temp + 1);
                ▲
               780
}
```

FIG. 7

METHOD AND APPARATUS FOR COMPILER PROCESSING FOR A FUNCTION MARKED WITH MULTIPLE EXECUTION SPACES

FIELD OF THE INVENTION

Embodiments according to the present invention generally relate to computing systems and specifically relate to extending the capabilities of standard computer programming languages for computing systems.

BACKGROUND OF THE INVENTION

The parallelization of tasks is used to increase the throughput of computer systems. To this end, compilers may extract parallelized tasks from program code to execute in parallel on the system hardware. To increase parallel execution on the hardware, a multi-core architecture may include multiple processor cores, e.g., a CPU, a GPU, a FPGA, etc. When an architecture includes multiple cores of different types it may be referred to as a heterogeneous multi-core architecture.

CUDA (Compute Unified Device Architecture) is a parallel computing platform and heterogeneous programming environment that allows the user to take advantage of the multi-core architecture which may include a CPU and a GPU, for example. Using CUDA, GPUs can be used for general purpose processing, and not exclusively for graphics processing. Thus, using CUDA, developers can develop code that can partially execute on a CPU and partially on a GPU. In other words, some code may be assigned to the CPU while other code may be assigned to the GPU, etc. The CUDA platform is accessible to software developers through, for example, extensions to industry-standard programming languages including C++. CUDA C++, therefore, extends the standard C++ language to target heterogeneous programming.

Similar to CUDA C++, C++ Accelerated Massive Parallelism (C++ AMP) extends the standard C++ language by taking advantage of data parallel hardware such as graphics processing unit (GPU) on a discrete graphics card. By using C++AMP, the programmer can code multi-dimensional data algorithms so that execution can be accelerated by using parallelism on heterogeneous hardware.

In both CUDA C++ and C++ AMP, functions are associated with one or more execution spaces that denote the underlying computing substrate on which the function may be executed. For example, a function could be associated with two different execution spaces, wherein one execution space denotes the CPU computing substrate and the other execution space denotes the GPU computing substrate. The problem with conventional compilers that compile code for heterogeneous programming environments is that their method of processing functions marked with multiple execution spaces is complex and computationally inefficient. For example, conventional compilers will typically need to generate and represent multiple parse trees for each execution space invoked by a function. This is not only complex but also inefficient.

BRIEF SUMMARY OF THE INVENTION

Accordingly, a need exists for a system and method that provides efficient and straightforward compiler processing for a function marked with multiple execution spaces in a heterogeneous programming environment. In one embodiment, the present invention provides an effective method of processing and representing the definition of a function that is marked with multiple execution spaces.

When a function that is marked with multiple execution spaces is about to be processed inside the compiler, embodiments of the present invention configure the compiler to save all the lexical tokens corresponding to the function body from the definition entry to the definition exit for the function. In one embodiment, the compiler further clones the lexical tokens for each execution space specified in the function's declaration. Further, in one embodiment of the present invention, the cloned set of tokens is inserted into the body of an if-condition statement, e.g., an IF-EXEC statement and there is one if-statement for each execution space. The conditional expression of each if-statement is designed to check whether the function is executing in the corresponding execution space.

In one embodiment of the present invention, when attempting overload resolution at a call site inside the function, the candidates are checked for compatibility with the execution space specified in the enclosing if-statement that was inserted by the processing step discussed above. Further, when generating code for a particular execution space in the compiler backend, the code inside all the conditional if-statements that does not correspond to the chosen execution space is simply dropped.

In one embodiment, the present invention is a method for processing a function with a plurality of execution spaces. The method comprises creating an internal compiler representation for the function, wherein the creating comprises: (a) copying substantially all lexical tokens corresponding to a body of the function; and (b) inserting the lexical tokens into a plurality of conditional if-statements, wherein a conditional if-statement is generated for each corresponding execution space of the plurality of execution spaces, and wherein each conditional if-statement determines which execution space the function is executing in. During compilation, the method further comprises performing overload resolution at a call site of an overloaded function by checking for compatibility with a first execution space specified by one of the plurality of conditional if-statements, wherein the overloaded function is called within the body of the function.

In another embodiment, the present invention is a non-transitory computer-readable storage medium having stored thereon, computer executable instructions that, if executed by a computer system cause the computer system to perform a compilation method for processing a function with multiple execution spaces. The method comprises creating an internal compiler representation for the function, wherein the creating comprises: (a) copying substantially all lexical tokens corresponding to a body of the function; and (b) inserting the lexical tokens into a plurality of conditional if-statements, wherein a conditional if-statement is generated for each corresponding execution space of the plurality of execution spaces, and wherein each conditional if-statement determines which execution space the function is executing in. During compilation, the method further comprises performing overload resolution at a call site of an overloaded function by checking for compatibility with a first execution space specified by one of the plurality of conditional if-statements, wherein the overloaded function is called within the body of the function.

In a different embodiment, the present invention is a system for processing a function with multiple execution spaces. The system comprises a memory storing information related to a heterogeneous programming environment, wherein the programming environment comprises a compiler to compile the function with multiple execution spaces. It also comprises a processor coupled to the memory, the processor operable to implement a method of compiling comprising creating an internal compiler representation for the function, wherein the creating comprises: (a) cloning substantially all lexical tokens corresponding to a body of the function; and (b) inserting the lexical tokens into a plurality of conditional if-statements, wherein a conditional if-statement is generated for each corresponding execution space, and wherein each conditional if-statement determines which execution space the function is executing in. During compilation, the processor implemented method further comprises, performing overload resolution at a call site of an overloaded function by checking for compatibility with a first execution space specified by one of the plurality of conditional if-statements, wherein the overloaded function is called within the body of said function.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 2 illustrates the manner in which overload resolution works in instances where multiple versions of a function are marked as targeting multiple respective execution spaces.

FIG. 3 illustrates a case wherein the internal compiler representation for a function needs to be different for each execution space given by its restriction specifier.

FIG. 4A illustrates memory resident psuedocode corresponding to the compiler internal representation of the body of function "bar" from FIG. 3 after overload resolution in accordance with one embodiment of the present invention.

FIG. 4B illustrates the memory resident output of the compiler backend for the code snippet illustrated in FIG. 4A targeting the amp execution platform in accordance with one embodiment of the present invention.

FIG. 5A illustrates the source code of a function prior to performing token cloning and token label renaming in accordance with embodiments of the present invention.

FIG. 5B illustrates the internal compiler representation of the function from FIG. 5A after token cloning is performed in accordance with embodiments of the present invention.

FIG. 6 illustrates an example of an overloaded function returning different output types at the call site within a function marked with multiple execution spaces in accordance with an embodiment of the present invention.

FIG. 7 is another example of the manner in which different parse trees can result for different execution spaces in accordance with embodiments of the present invention.

DETAILED DESCRIPTION OF THE INVENTION

Figure 1:
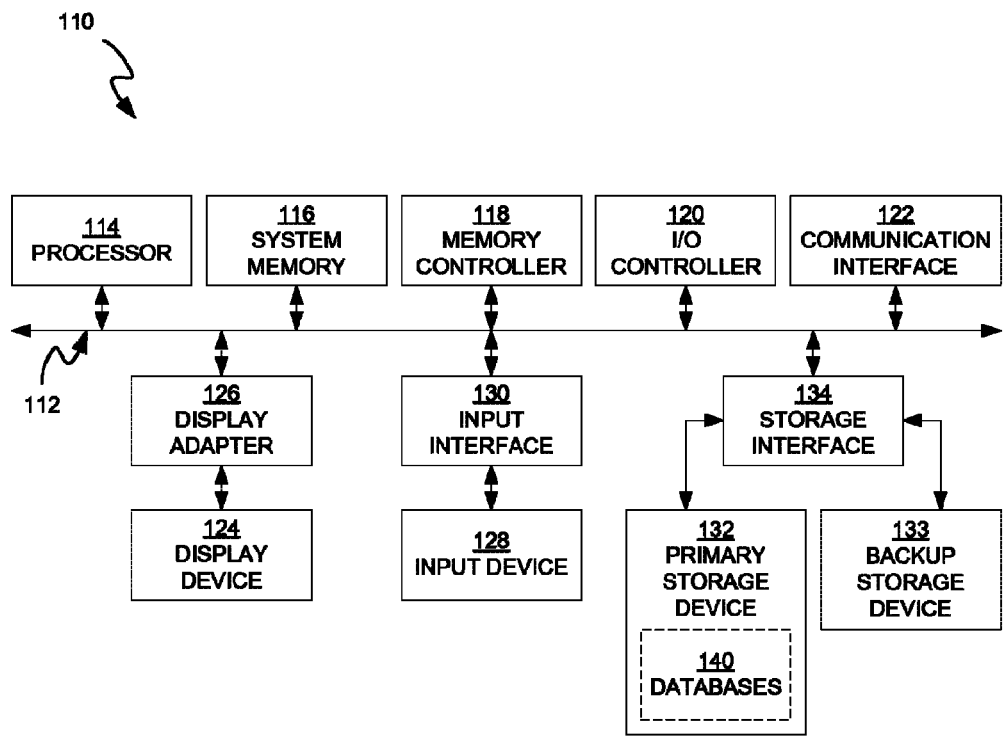
FIG. 1 is an exemplary computer system in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "cloning," "inserting," "performing," "deleting," or the like, refer to actions and processes (e.g., flowchart 800 of FIG. 8) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. For example, processing unit 114 may represent a central processing unit (CPU), a graphics processing unit (GPU), or both. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

A Method and Apparatus for Compiler Processing for a Function Marked with Multiple Execution Spaces Embodiments of the present invention provide methods and systems for efficient and straightforward compiler processing for a function marked with multiple execution spaces in a heterogeneous programming environment. In one embodiment, the present invention provides a simple method of representing the definition of a function that is marked with multiple execution spaces.

FIG. 2 illustrates the manner in which overload resolution operates in instances where multiple versions of a function are marked as targeting multiple respective execution spaces. It should be noted while the examples provided within the context of the present invention use the Microsoft AMP C++ programming language, the invention is not so limited. In fact, embodiments of the present invention are equally applicable to other programming languages supporting heterogeneous programming environments such as CUDA C++. More specifically, embodiments of the present invention are applicable to all programming languages supporting heterogeneous programming environments that allow overloading based on execution spaces and function declarations with multiple execution spaces.

In the program portion illustrated in FIG. 2, the "restrict" annotation, also known as a restriction specifier, as used in commands 210 and 220 can specify a single or a set of execution spaces for the function being defined. The single or set of execution spaces specified becomes part of the function type. Accordingly, the restriction specifier can enforce restrictions on the code in the function and on the behavior of the function in applications that use the C++ AMP runtime.

In the code section shown in FIG. 2, the two versions of function "foo", 210 and 220, are marked as targeting the "amp" and "cpu" execution spaces. The restrict(cpu) specifier informs the compiler that function 220 "foo" will only execute on one type of target device, e.g., CPU. Similarly, the restrict(amp) specifier used in connection with function 210, "foo", informs the compiler that function 210, "foo", will execute on a different type of target device, e.g., a GPU. By way of further example, the definition of function 230 "bar" is marked as targeting both the "cpu" and "amp" execution spaces. In other words, function "bar" has multiple restriction specifiers attached to it. Depending on the context, therefore, function bar could execute, for example, on both the CPU and the GPU. It should also be noted that the present invention is not limited to the "amp" and "cpu" execution spaces—other embodiments may also invoke execution spaces for an FPGA, an x86 processor, an x64 processor etc.

Programming languages such as Microsoft AMP C++ provide the capability to overload functions on restriction specifiers. Since the execution spaces change the function's type, the two versions of function "foo" discussed above overload. Function overloading is a feature found in programming languages such as C++ that allows creating several functions or methods with the same name, which may differ from each other in the type of input and output of the function. It is simply defined as the ability of one function to perform different tasks. Further, the process of selecting the most appropriate overload function is called overload resolution.

Certain programming languages, including Microsoft AMP C++, extend conventional overload resolution rules at a call site of a function so that the version of the called function that is compatible with the caller is selected. For example, consider functions 240, "first", and 260, "second". Both functions, call function "foo" at lines 250 and 270 respectively. However, each caller selects the version of function "foo" compatible with its execution space to be invoked. Stated differently, the version of "foo" selected will depend on the context execution type. Function call 250, for instance, calls the amp version of "foo" because it is compatible with the execution space of caller "first." Similarly, function call 260 calls the cpu version of "foo" because it is compatible with the execution space of caller "second."

When a function, e.g., "bar" 230 is marked with multiple restrict values, it will need to target all the execution spaces given by the restrict values. For example, a version of function "bar" 230 must be compiled to execute in the "cpu" execution space, and another one must be compiled to execute in the "amp" execution space, wherein the "cpu" execution space can be associated with a host, e.g. a CPU and the "amp" execution space can be associated with a secondary device, e.g., a GPU. Within such a function, the conventional overload resolution rules may select different candidates with respect to each execution space as will be discussed further below in relation to FIG. 3.

FIG. 3 illustrates a case wherein the internal compiler representation for a function needs to be different for each execution space given by its restriction specifier.

Similar to FIG. 2, functions 310 and 330 are both named "foo" and are overloaded functions. Function 310 is of type restrict(cpu) and takes in an input parameter of type double while function 330 is of type restrict(amp) and takes in an input parameter of type int. Function 350 "bar" is marked with multiple restriction specifiers, similar to the function "bar" in FIG. 2, and, therefore, there are different versions of function "bar" for each execution target, cpu and amp.

The version of function "bar" 350 that targets the amp execution space calls the amp version of "foo" (function 330) and needs to insert an implicit cast expression from type double to type integer. This is because the input parameter "in" for function bar 350 is of type double, which is also passed to the function call of "foo" 360, but the parameter type for the amp version of "foo" is an integer. Conversely, no such cast is required for the cpu version of bar, which calls the cpu version of "foo" because the parameter type of the cpu version of "foo" is also double. Accordingly, this example demonstrates a case where the internal compiler representation for function "bar" needs to be different for each execution space given by its restrict annotation. In general, at each call site, overload resolution for each execution space for the caller may result in a different candidate function to be called. As a result, the intermediate compiler representation for each version of the function can be quite different.

Conventional compilers do not have an efficient and straightforward mechanism of addressing instances where the internal compiler representation for a function, e.g., function "bar" 350 needs to be different for each execution space given by its restriction specifier. For a function such as "bar," a conventional compiler would typically build a complex intermediate representation involving parse trees. However, the source program only specifies a single set of lexical tokens for the body of function "bar." Generating and representing a complex parse tree with multiple branches in the intermediate representation given one lexical token stream is complicated from the compiler standpoint. A conventional compiler, for example, would insert a checkpoint when it reaches call expression 360, cache all the tokens for the call expression, process it once for the cpu execution space, build up the parse tree, then go back and process the call expression again for the amp execution space and continue to build up the complex representation of the function by adding multiple branches to the same parse tree. This can be computationally difficult.

It is appreciated that embodiments of the present invention present an efficient method of processing and representing the definition of a function that is marked with multiple execution spaces, e.g., function "bar" 350. When a function that is marked with multiple execution spaces is about to be processed inside the compiler, embodiments of the present invention configure the compiler to save all the lexical tokens corresponding to the function body from the definition entry to the definition exit for the function. In one embodiment, the compiler further advantageously clones the lexical tokens for each execution space specified in the function's declaration. Further, in one embodiment of the present invention, the cloned set of tokens is inserted into the body of an if-condition statement, e.g., an IF-EXEC statement and there is one if-statement for each execution space. The conditional expression of each if-statement is designed to check whether the function is executing in the corresponding execution space.

In one embodiment of the present invention, when attempting overload resolution at a call site inside the function, e.g., call site 360 within function 350 in FIG. 3, the candidates are checked for compatibility with the execution space specified in the enclosing if-statement that was inserted by the processing step discussed above. Further, when generating code for a particular execution space in the compiler backend, the code inside all the conditional if-statements that do not correspond to the chosen execution space are simply dropped. As a result, unlike conventional compilers, the present invention advantageously prevents the need to create checkpoints at the call site, and further prevents the need to backtrack in order to cache tokens and continue to build up the same parse tree.

Instead, the token cloning approach of the present invention allows completely different parse trees to be built for the function body, e.g., function "bar" 350 for each execution space specified for the function. Further, at the call site, embodiments of the present invention simply check the execution space specified in the enclosing if-statement that the call site is invoked within and, subsequently, bind the call to the corresponding execution space. By preemptively replicating the tokens for a function marked with multiple execution spaces and inserting them in multiple conditional statements, embodiments of the present invention prevent the complex processing and building of a complex single parse tree required by conventional compilers. When a call site, e.g., "foo" 360 is reached, embodiments of the present invention process the call, check the context execution space, bind the call to the right context execution space, and insert a cast if necessary.

FIG. 4A illustrates memory resident psuedocode corresponding to the compiler internal representation of the body of function "bar" from FIG. 3 after overload resolution in accordance with one embodiment of the present invention. As the compiler is processing the body of function "bar" 350 in FIG. 3, the tokens are cloned and if-statements e.g., IF-EXEC statements, are inserted as described above.

The compiler internal representation for function "bar" 410 comprises inserting the cloned lexical tokens from the body of function "bar" into the body of an if-condition statement, wherein there is one if-statement for each execution space. As shown in FIG. 4A, if-statement 430 is inserted for the amp execution space while if-statement 450 is inserted for the cpu execution space. As discussed above and shown in FIG. 4A, the conditional expression of each if-statement is designed to check whether the function is executing in the corresponding execution space, e.g., amp or cpu. Stated differently, when attempting overload resolution of function "foo" at a call site, the compiler internal representation of the code shown in FIG. 4A allows the candidate function to be checked for compatibility with the execution space specified in either enclosing if-statement 430 or 450.

The amp version of function "foo" is invoked at 420. As discussed above, the amp version of "foo" (function 330) needs a compiler-inserted cast from type double to type integer for its input parameter type which is of type integer. Embodiments of the present invention automatically insert this cast when cloning the lexical tokens. By contrast, no cast is inserted for the cpu version of "foo" (function 310) at 440 because the input parameter type is double.

As indicated above, when the compiler backend is generating code for a particular execution space, only the code inside the if-statement checking for that execution space is preserved, while the if-statements checking for other execution spaces are omitted. FIG. 4B illustrates the memory resident output of the compiler backend for the code section illustrated in FIG. 4A targeting the amp execution platform in accordance with one embodiment of the present invention. Because the amp execution is targeted, the if-statements checking for other execution spaces and the code enclosed within those if-statements, e.g., lines 450, 440 are omitted. The only code maintained is the code inside the if-statement checking for the amp execution space, e.g., line 420. Accordingly, while the representation of the code is expanded within the compiler as a result of the multiple if-statements, as shown in FIG. 4A, there is no run-time expansion. In other words, the binary generated from the code does not include the extraneous conditional statements or code from the untargeted execution spaces.

In comparison to the approach taken by embodiments of the present invention, the compiler code handling overload resolution at call sites in conventional compilers must be modified to invoke overload resolution for each execution space of the caller, and new intermediate expressions must be synthesized to copy arguments for the call for each selected candidate, and also to select the result value returned by the candidate function according to the execution space. This compiler support needs to be added for all different implicit and explicit call scenarios described in the programming language, e.g., overloaded operator function call, implicit conversion function call, constructors, destructors, explicit function call.

By contrast, embodiments of the present invention take the less complicated approach as discussed above. At any call site, there is only one active execution space, corresponding to the execution space checked in the enclosing synthesized if-statement e.g. an "IF-EXEC" statement. Thus, when processing a call site, the compiler needs to invoke overload resolution for only one execution space, which is easier to implement.

In addition to token cloning and synthesizing if-statements, in one embodiment of the present invention, the compiler advantageously also renames any label tokens that appear in the lexical tokens comprising the function body. FIG. 5A illustrates the source code of a function prior to performing token cloning and token label renaming in accordance with embodiments of the present invention. Function "test" 510 comprises a label "L2" 540 that needs to be renamed before token cloning takes place. This is because label names must be unique in a function body for a legal C++ program.

FIG. 5B illustrates the internal compiler representation of the function from Figure 5A after token cloning is performed in accordance with embodiments of the present invention. After token cloning, if-statements 570 and 593 are inserted in accordance with the discussion above and also the labels are renamed. Each of the if-statements checks for the corresponding execution space as explained above. The "L2" label is renamed at four separate instances. Within the if-statement that checks for the amp execution space 570, label "L2" is renamed as "L2_amp" at lines 580 and 591. Also, within the if-statement that checks for the cpu execution space 593, label "L2" is renamed as "L2_cpu" at lines 594 and 596. By performing label renaming, embodiments of the present invention allow the token cloning to conform with the rules of the programming language, e.g., C++.

Unlike conventional compilers, the embodiments of the present invention also advantageously allow for more flexibility in language rules. In other words, the simple processing techniques of the present invention allow the programming language to become more general. For example, it allows a function overloaded on restriction specifiers, e.g., "foo" with multiple versions, 310 and 330, that is invoked within a function marked with multiple execution spaces, e.g., "bar" 350 to return different output types. In other words, the restrict(cpu) version of "foo" may be allowed to return a different type than the restrict(amp) version of "foo." In conventional compilers, a function that overloads on the restrict qualifier must return identical types for all its various instances. By comparison, conventional programming languages, e.g., Microsoft AMP C++ are more restricted. Any expression involving overloaded call expressions must have the same result type irrespective of execution space. Embodiments of the present invention have the advantage of not placing any such restriction.

FIG. 6 illustrates an example of an overloaded function returning different output types at the call site within a function marked with multiple execution spaces in accordance with an embodiment of the present invention. As shown in FIG. 6, the return type of "foo" 660 is int while the return type of "foo" 670 is double. At the call site in "bar" 680, therefore, the version of "foo" selected for the amp and cpu execution spaces have different return types, int and double respectively. Thus, the expression "foo( )" 690 has different types for the amp and cpu execution spaces, which conventional compilers have not allowed. Embodiments of the present invention, however, as a result of the increased flexibility in language rules remove this restriction. Accordingly, the expression "foo( )" 690 can have different types when considering execution spaces.

FIG. 7 is another example of the manner in which different parse trees can result for different execution spaces in accordance with embodiments of the present invention.

As shown in FIG. 7, the execution space set for function "compute" 750 is restrict(amp, cpu). As explained above, function "compute" 750 is a function that is marked with multiple execution spaces. The expression "temp+1" 780 will need to be parsed differently when considering the amp and cpu execution spaces for "compute," respectively.

For the cpu execution space, the expression will need to be parsed as "operator+(temp,1)". This expression calls the function "operator+" with the arguments "temp" and "1."

For the amp space, the expression will be parsed as "(operator int(temp))+1". This expression calls the implicit conversion function "S1_t.operator int( )" to convert temp to an integer, then adds that integer to 1.

This example demonstrates that different parse trees need to be built when considering different execution spaces. Embodiments of the present invention make this simpler and straightforward by cloning the entire tokens comprising the caller function "compute" for each execution space, amp and cpu, as explained above.

Figure 8:
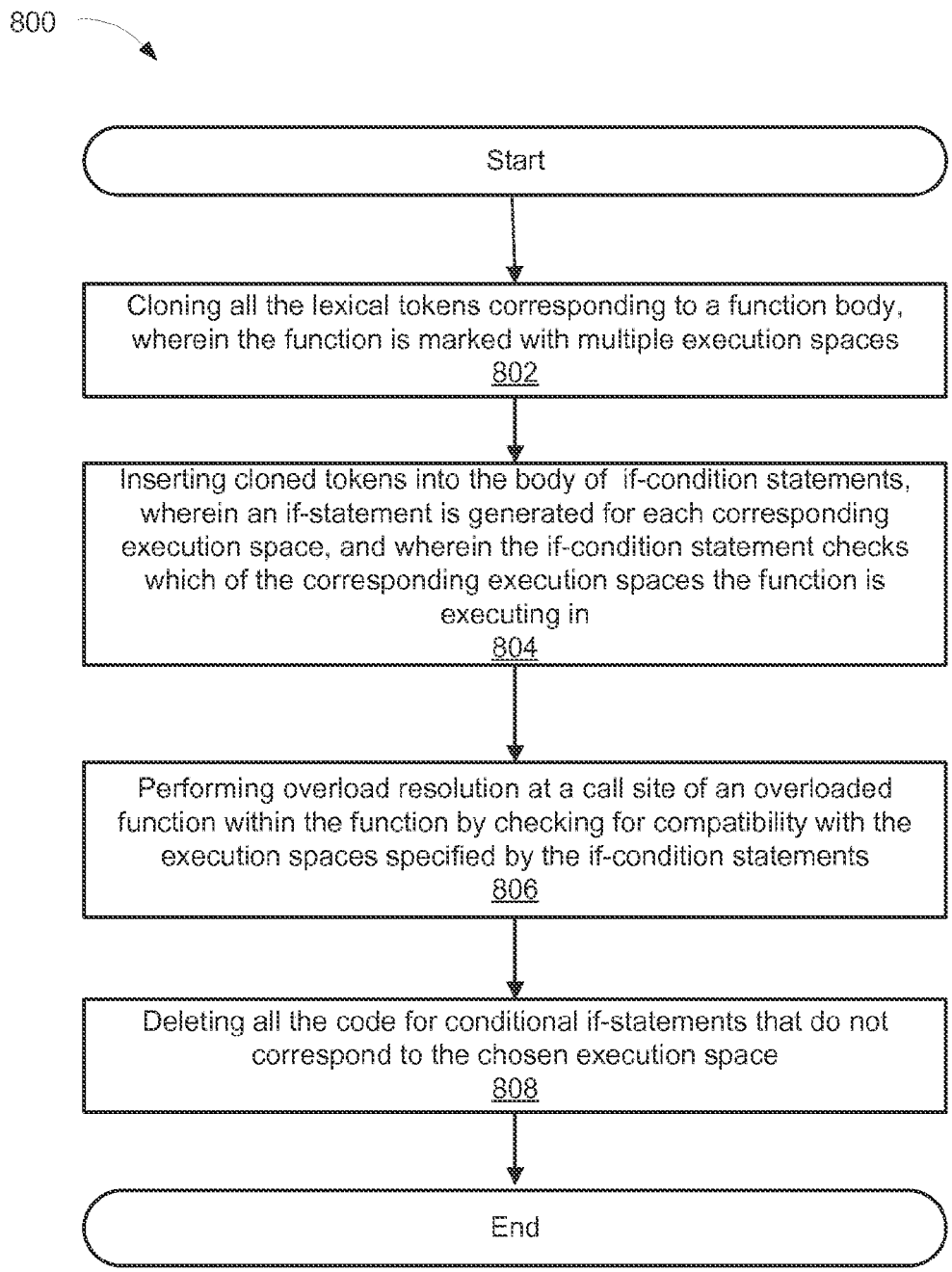
FIG. 8 shows a flowchart of an exemplary computer-implemented process of processing functions with multiple execution spaces in accordance with embodiments of the present invention.

FIG. 8 shows a flowchart 800 of an exemplary computer-implemented process of processing functions with multiple execution spaces in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 8 should not be construed as limiting the scope of the invention. Rather, it will be apparent to persons skilled in the relevant art(s) from the teachings provided herein that other functional flows are within the scope and spirit of the present invention. Flowchart 800 may be described with continued reference to exemplary embodiments described above, though the method is not limited to those embodiments.

At step 802, lexical tokens inside the function body of the function with multiple execution spaces is cloned, e.g., function "bar" 410. This is the first part of creating an internal representation of the function in the compiler.

At step 804, the cloned lexical tokens inside the function body are inserted into the body of if-condition statements, wherein an if-condition statement is generated for each corresponding execution space of the function, and wherein the if-condition statement checks which of the multiple execution spaces the function is executing in. This is the second part of creating an internal representation of the function in the compiler. As shown in FIG. 4A and explained above, if-statement 430 is inserted for the amp execution space while if-statement 450 is inserted for the cpu execution space.

At step 806, overload resolution is performed at a call site of an overloaded function with the function invoking multiple execution spaces. Overload resolution is performed by checking for compatibility with the execution spaces specified by the if-condition statements. As discussed above, when attempting overload resolution of function "foo" at a call site, the compiler internal representation of the code shown in FIG. 4A allows the candidate function to be checked for compatibility with the execution space specified in either enclosing if-statement 430 or 450.

Finally, at step 808, all the code for conditional if-statements that do not correspond to the chosen execution space is deleted. As shown in FIG. 4B, because the amp execution is targeted, the if-statements checking for other execution spaces and the code enclosed within those if-statements, e.g., lines 450, 440 are omitted. The only code maintained is the code inside the if-statement checking for the amp execution space, e.g., line 420.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for processing a function with a plurality of execution spaces comprising:
   creating an internal compiler representation for said function, wherein said creating comprises:
     copying substantially all lexical tokens corresponding to a body of said function; and
     inserting said lexical tokens into a plurality of conditional if-statements, wherein a conditional if-statement is generated for each corresponding execution space of said plurality of execution spaces, and
   wherein each conditional if-statement determines which execution space said function is executing in; and
   during compilation, performing overload resolution at a call site of an overloaded function by checking for compatibility with a first execution space specified by one of said plurality of conditional if-statements, wherein said overloaded function is called within said body of said function.

2. The method of claim 1, further comprising:
   deleting code associated with each conditional if-statement not corresponding to said first execution space during said compilation.

3. The method of claim 1, wherein said creating further comprises:
   renaming label tokens appearing in said lexical tokens, wherein each label token receives a unique name corresponding to each execution space.

4. The method of claim 1, wherein an underlying computing substrate corresponding to an execution space is selected from the group consisting of: a CPU, a GPU, an FPGA, an x86 processor and an x64 processor.

5. The method of claim 1, wherein said overloaded function comprises different return types for each corresponding execution space.

6. The method of claim 1, further comprising:
   during said compilation, performing overload resolution at a call site of said overloaded function by checking for compatibility with a second execution space specified by one of said plurality of conditional if-statements.

7. The method of claim 1, wherein each of said plurality of conditional if-statements and associated execution space corresponds to a discrete parse tree.

8. A non-transitory computer-readable storage medium having stored thereon, computer executable instructions that, if executed by a computer system cause the computer system to perform a compilation method for processing a function with multiple execution spaces comprising:
  creating an internal compiler representation for said function, wherein said creating comprises:
    cloning substantially all lexical tokens corresponding to a body of said function; and
    inserting said lexical tokens into a plurality of conditional if-statements, wherein a conditional if-statement is generated for each corresponding execution space of said plurality of execution spaces, and wherein each conditional if-statement determines which execution space said function is executing in; and
  during compilation, performing overload resolution at a call site of an overloaded function by checking for compatibility with a first execution space specified by one of said plurality of conditional if-statements, wherein said overloaded function is called within said body of said function.

9. The computer-readable medium as described in claim 8, wherein said method further comprises:
  deleting code associated with each conditional if-statement not corresponding to said first execution space during said compilation.

10. The computer-readable medium as described in claim 9, wherein said method further comprises:
  renaming label tokens appearing in said lexical tokens, wherein each label token receives a unique name corresponding to each execution space.

11. The computer-readable medium as described in claim 9, wherein an underlying computing substrate corresponding to an execution space is selected from the group consisting of: a CPU, a GPU, an FPGA, an x86 processor and an x64 processor.

12. The computer-readable medium as described in claim 9, wherein said overloaded function comprises different return types for each corresponding execution space.

13. The computer-readable medium as described in claim 9, wherein said method further comprises:
  during said compilation, performing overload resolution at a call site of said overloaded function by checking for compatibility with a second execution space specified by one of said plurality of conditional if-statements.

14. The computer-readable medium as described in claim 9, wherein said plurality of conditional if-statements are IF-EXEC statements, and wherein each of said plurality of conditional if-statements and associated execution space corresponds to a discrete parse tree.

15. A system for processing a function with multiple execution spaces, said system comprising:
  a memory storing information related to a heterogeneous programming environment, wherein said programming environment comprises a compiler to compile said function with multiple execution spaces;
  a processor coupled to said memory, the processor operable to implement a method of compiling comprising:
    creating an internal compiler representation for said function, wherein said creating comprises:
      cloning substantially all lexical tokens corresponding to a body of said function; and
      inserting said lexical tokens into a plurality of conditional if-statements, wherein a conditional if-statement is generated for each corresponding execution space, and wherein each conditional if-statement determines which execution space said function is executing in; and
    during compilation, performing overload resolution at a call site of an overloaded function by checking for compatibility with a first execution space specified by one of said plurality of conditional if-statements, wherein said overloaded function is called within said body of said function.

16. The system of claim 15, wherein said method further comprises:
  deleting code associated with each conditional if-statement not corresponding to said first execution space during code generation.

17. The system of claim 15, wherein said method further comprises:
  during said compilation, performing overload resolution at a call site of said overloaded function by checking for compatibility with a second execution space specified by one of said plurality of conditional if-statements.

18. The system of claim 15, wherein an underlying computing substrate corresponding to an execution space is selected from the group consisting of: a CPU, a GPU, an FPGA, an x86 processor and an x64 processor.

19. The system of claim 15, wherein said overloaded function comprises different return types for each corresponding execution space.

20. The system of claim 15, wherein each of said plurality of conditional if-statements and associated execution space corresponds to a discrete parse tree.

* * * * *